US007163256B2

(12) United States Patent
Haunstetter

(10) Patent No.: US 7,163,256 B2
(45) Date of Patent: Jan. 16, 2007

(54) MOTOR VEHICLE HAVING A LOCK

(75) Inventor: Frank Haunstetter, Wimsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/853,283

(22) Filed: May 26, 2004

(65) Prior Publication Data

US 2004/0239139 A1 Dec. 2, 2004

(30) Foreign Application Priority Data

May 27, 2003 (DE) ................................ 103 23 955

(51) Int. Cl.
*B60J 5/00* (2006.01)

(52) U.S. Cl. ............. 296/146.4; 296/1.04; 296/193.11; 292/93; 292/DIG. 14

(58) Field of Classification Search ............... 296/37.1, 296/146.4, 146.9, 1.04, 181.1, 191, 193.11, 296/97.22; 292/DIG. 14, DIG. 23, DIG. 42, 292/DIG. 43, 92, 93; 180/69.2; 70/240, 70/241, 274

See application file for complete search history.

(56) References Cited

U.S. PATENT DOCUMENTS

| | | | | |
|---|---|---|---|---|
| 4,430,685 | A * | 2/1984 | Ellsberg | 70/241 |
| 4,458,930 | A | 7/1984 | Goike et al. | |
| 4,702,094 | A * | 10/1987 | Peterson | 70/241 |
| 4,708,378 | A * | 11/1987 | Ingenhoven | 292/DIG. 23 |
| 6,499,789 | B1 * | 12/2002 | Moll et al. | 296/97.22 |

FOREIGN PATENT DOCUMENTS

| | | |
|---|---|---|
| DE | 4028897 | 10/1991 |
| DE | 4210084 | 10/1992 |
| DE | 44 25 423 | 8/1995 |
| DE | 19744904 | 4/1999 |
| DE | 198 35 821 | 2/2000 |
| DE | 199 30 012 | 1/2001 |
| DE | 19961885 | 6/2001 |
| GB | 2350167 | 11/2000 |
| WO | WO 01/76921 | 10/2001 |

OTHER PUBLICATIONS

European Search Report dated Nov. 16, 2005.

* cited by examiner

*Primary Examiner*—Jason Morrow
(74) *Attorney, Agent, or Firm*—Crowell & Moring LLP

(57) ABSTRACT

A motor vehicle has a lock with a movable locking element, particularly a rotary latch, which lock, in addition to being equipped with an electric unlocking device for the locking element, is equipped with a mechanical emergency unlocking device for the locking element. The emergency unlocking device includes a first pulling element which triggers the locking element independently of the electric unlocking device into a release position, in which release position a closing element is released which is fastened to a vehicle body part to be opened. So that the emergency unlocking device can be made available without high mounting expenditures, it is provided that the electric unlocking device comprises an electric actuator which acts by way of a second pulling element upon the lock and, in the process, triggers the locking element into the release position, in that the first pulling element of the emergency unlocking device is coupled with the second pulling element by means of a connection device, and in that the connection is situated on the second pulling element between the actuator and the lock.

18 Claims, 1 Drawing Sheet

MOTOR VEHICLE HAVING A LOCK

This application claims the priority of German Patent Application No. 103 23 955.3 filed May 27, 2003, the disclosure of which is expressly incorporated by reference herein.

BACKGROUND AND SUMMARY OF THE INVENTION

The invention is based on a motor vehicle having a lock with a movable locking element which can be moved by both an electric unlocking device and an emergency unlocking device. Preferred embodiments of the invention relate to a motor vehicle having a lock with a movable locking element, particularly a rotary latch, which lock, in addition to being equipped with an electric unlocking device for the locking element, is equipped with a mechanical emergency unlocking device for the locking element, the emergency unlocking device comprising a first pulling element which triggers the locking element independently of the electric unlocking device into a release position, in which release position a closing element is released which is fastened to a vehicle body part to be opened.

A motor vehicle of the above-mentioned type is disclosed in German Patent Document DE 44 25 423 C1. It is equipped with a lock which has a movable locking element in the form of a rotary or fork-type latch. In addition to an electric unlocking device for the lock, which is not described in detail, a mechanical emergency unlocking device is also provided which comprises a Bowden cable as the pulling element, so that the locking element can be controlled into a release position independently of the electric unlocking device. In this case, the Bowden cable acts upon a so-called detent pawl which can be swiveled and, as a result, releases the fork-type latch so that a closing element, for example, the closing pin, which is mounted on a vehicle body part to be opened, is released by the fork-type latch, whereby the vehicle body part can be opened. In the case of the known motor vehicle, a mechanism can be used for the emergency unlocking device, which mechanism has a lever which acts upon an operating rod guided in the closing pin.

It is an object of the invention to provide a motor vehicle of the initially-mentioned type, in which the mechanical emergency unlocking device for the lock can be provided without any major expenditures.

This object is achieved by a motor vehicle having a lock with a movable locking element, particularly a rotary latch, which lock, in addition to being equipped with an electric unlocking device for the locking element, is equipped with a mechanical emergency unlocking device for the locking element, the emergency unlocking device comprising a first pulling element which triggers the locking element independently of the electric unlocking device into a release position, in which release position a closing element is released which is fastened to a vehicle body part to be opened, wherein the electric unlocking device comprises an electric actuator which acts by way of a second pulling element upon the lock and, in the process, triggers the locking element into the release position, in that the first pulling element of the emergency unlocking device is coupled with the second pulling element by means of a connection device, and in that the connection device is situated on the second pulling element between the actuator and the lock.

Other advantageous features of preferred embodiments of the invention are described herein and in the claims.

Important advantages achieved by means of the invention are that the emergency unlocking device according to the invention requires only a pulling element, such as a cable control, whereby, in addition to the reduction of mounting expenditures, costs can be saved. It is also advantageous that already-existing locks can subsequently be equipped with the mechanical emergency unlocking device, which is easy to mount.

According to a further development of certain preferred embodiments wherein the first pulling element is coupled by means of its one connecting end by way of the connection device with the second pulling element and, by means of its second actuating end, is guided out of a vehicle body space covered by the vehicle body part to the exterior side of the vehicle. It is advantageous with this arrangement that the emergency unlocking of the lock can be actuated without any access to the vehicle body space covered by the vehicle body part and, furthermore, an emergency unlocking can take place from the exterior side of the vehicle.

If the emergency unlocking device according to the invention is provided, for example, for a vehicle body part which covers a luggage compartment, the first pulling element is guided along a wall of the luggage compartment and is covered by a covering part. It is thus prevented that luggage moving around in the luggage compartment during the drive triggers the emergency unlocking.

These and other objects, features and advantages of the present invention will become more readily apparent from the following detailed description of currently preferred configurations thereof when taken in conjunction with the accompanying drawings wherein:

DETAILED DESCRIPTION OF THE DRAWINGS

Figure 1:
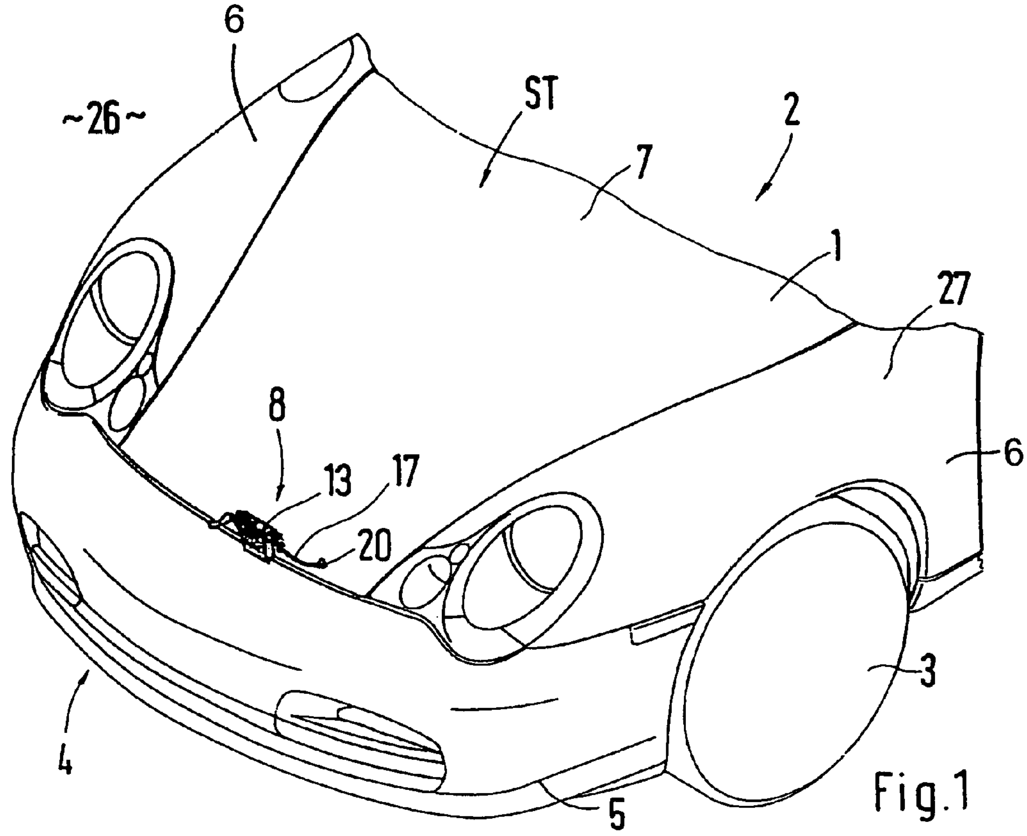
FIG. 1 is a view of a cutout of a motor vehicle having a lock, constructed according to a preferred embodiment of the present invention.

FIG. 1 is a cutout-type view of the body 1 of a motor vehicle 2. The vehicle body 1 is carried by wheels 3 and comprises a front-end part 4 which, in addition to a front-end covering part 5, also has lateral fenders 6 and a vehicle body part 7 which is arranged between the fenders 6 and is illustrated in FIG. 1 in its closed position ST in which it is held in a locked manner by means of a lock 8. Accordingly, the vehicle body part 7 can be opened from the closed position ST and is, in particular, constructed as a hood which can be folded open and which covers a vehicle body space 9 (FIG. 3) situated underneath. The vehicle body part 7 covers, for example, an on-board battery (not shown) used for the power supply and, in addition, the vehicle body space 9 situated under the vehicle body part 7 is constructed as a luggage compartment for accommodating cargo.

In order to be able to open the vehicle body part 7, the lock 8 is unlocked. For this purpose, on the one hand, an electric unlocking device 10, which can be supplied by means of the on-board battery, is provided and, on the other hand, an emergency unlocking device 11 is provided. The two unlocking devices 10 and 11 control a locking element 12 disposed in the lock 8, so that it can be moved into a release position or is triggered, in which it releases a closing element 13 which is fastened on the vehicle body part 7 and is constructed particularly as a closing bow or closing pin. The locking element 12 particularly is a so-called rotary latch or fork-type latch whose function and further development is known in the state of the art, so that they do not have to be discussed in detail.

The emergency unlocking device 11 has a first pulling element 14, particularly a cable control which, by means of its first end, the connecting end 15 is coupled by way of a connection device 16 with a second pulling element 17 of the electric unlocking device 10.

The unlocking or triggering of the locking element 12 into the release position takes place by the electric unlocking device 10 such that an electric actuator 18 arranged in the vehicle body space 9 moves the second pulling element 17 into the lock actuating direction BR and thus triggers the locking element 12.

Figure 2:
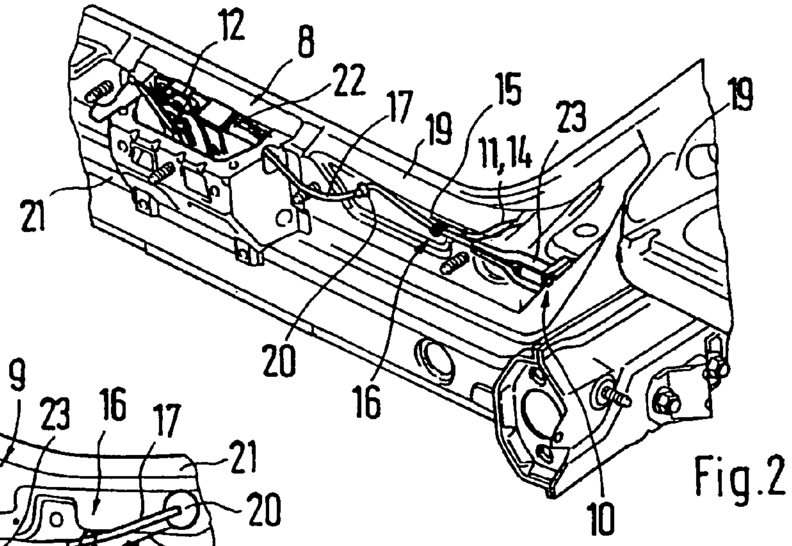
FIG. 2 is a view of a cutout of a lock carrier with a lock fastened thereon and an electric unlocking device as well as a mechanical emergency unlocking device, according to a first embodiment of the invention.
Figure 3:
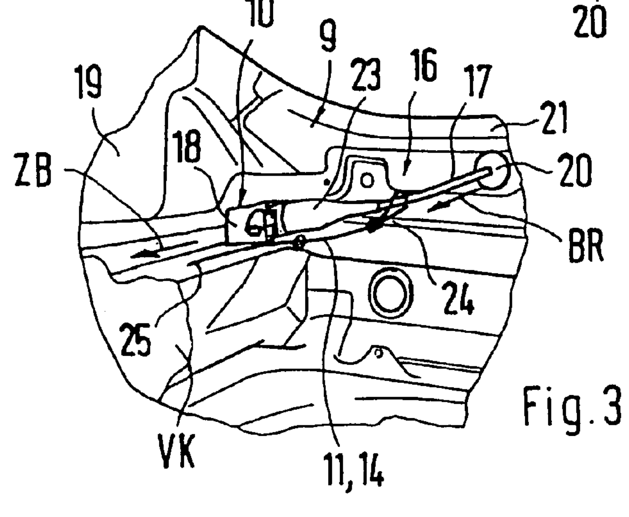
FIG. 3 is a view of an emergency unlocking device according to a second embodiment.

The actuator 18 is fastened on a space wall 19 of the vehicle body space 9. The second pulling element 17 is placed along the space wall 19 and is guided through an opening 20 of a lock carrier 21 and is connected with the lock 8. Furthermore, independently of the electric unlocking device 10, for example, in the event of a failure of the on-board battery, the locking element 12 can be triggered into the release position by way of the emergency unlocking device 11. For this purpose, the first pulling element 14 is mechanically coupled to the second pulling element 17 by way of the connection device 16 and, during a pulling actuation (arrow ZB) of the first pulling device 14 of the emergency unlocking device 11, this actuation ZB is transmitted to the second pulling device 17, which then acts upon the locking element 12 in the lock actuation direction BR. FIGS. 2 and 3 show that the connection device 16 is arranged between the lock-side linkage 22 and the actuating-drive-side linkage 23 of the second pulling element 17.

In the embodiment according to FIG. 2, the connection device 16 is constructed as a cable clamp which is fastened to one of the two pulling elements 14 or 17 and holds the other pulling element 14 or 17 in a clamping manner; in any case, it couples the two pulling elements 14 and 17 with one another such that as a result of the pulling actuation ZB, the second pulling device 17 is taken along in the lock actuation direction BR. The first pulling element 14 is guided on the space wall 19 in the corresponding laying direction.

According to the embodiment illustrated in FIG. 3, the connection device 16 is constructed as a loop 24 which is placed around the second pulling device 17, whereby the mutual coupling of the two pulling elements 14 and 17 is achieved. The loop 24 may be fixed by means of a cable clamp which is applied to the first pulling element 14.

As additionally shown in FIG. 3, the first pulling element 14 is guided along the space wall 19 inside the vehicle body space 9 and preferably covered by a covering part VK for this space wall 19, illustrated here only in sections, so that luggage or cargo arranged in the vehicle body space 9 when moved during the drive does not unintentionally actuate the emergency unlocking device 11. Furthermore, it may be provided that the other end, the actuating end 25, of the first pulling device 14 is lengthened and is led out of the vehicle body space 9 to the exterior side 26 of the vehicle and, for this purpose, penetrates, for example, through the space wall 19 in an opening not shown here. The actuating end 25 can be placed at a site under the vehicle body skin 27 which is not easily accessible, so that it becomes accessible only after the removal of at least one part of the motor vehicle 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle having a lock with a movable locking element, the lock, in addition to being equipped with an electric unlocking device for the locking element, being equipped with a mechanical emergency unlocking device for the locking element, the emergency unlocking device comprising a first pulling element which triggers the locking element independently of the electric unlocking device into a release position, in which release position, a closing element is released which is fastened to a vehicle body part to be opened, wherein the electric unlocking device comprises an electric actuator which acts by way of a second pulling element upon the lock and, in the process, triggers the locking element into the release position, wherein the first pulling element of the emergency unlocking device is coupled with the second pulling element by means of a connection device, wherein the connection device is situated on the second pulling element between the actuator and the lock, and wherein the second pulling element is a cable control.

2. Motor vehicle according to claim 1, wherein the first pulling element is a cable control.

3. Motor vehicle according to claim 1, wherein the first pulling element is coupled by means of its one connecting end by way of the connection device with the second pulling element and, by means of its second actuating end, is guided out of a vehicle body space covered by the vehicle body part to the exterior side of the vehicle.

4. Motor vehicle according to claim 1, wherein the connection device is constructed as a cable clamp.

5. Motor vehicle according to claim 1, wherein the connecting end of the first pulling element is constructed as a loop which is placed around the second pulling element.

6. Motor vehicle according to claim 1, wherein the vehicle body space is a luggage compartment, and wherein the vehicle body part to be opened is a hood covering the luggage compartment.

7. Motor vehicle according to claim 4, wherein the vehicle body space is a luggage compartment, and wherein the vehicle body part to be opened is a hood covering the luggage compartment.

8. Motor vehicle according to claim 4, wherein the first pulling element is guided along a space wall bounding the vehicle body space and is covered by a covering part for the space wall.

9. Motor vehicle according to claim 8, wherein the actuating end of the first pulling device is guided through the space wall out of the vehicle body space.

10. Motor vehicle according to claim 7, wherein the first pulling element is guided along a space wall bounding the vehicle body space and is covered by a covering part for the space wall.

11. Motor vehicle according to claim 10, wherein the actuating end of the first pulling device is guided through the space wall out of the vehicle body space.

12. A lock assembly for locking a closing member covering a vehicle body space in a vehicle body, comprising:

a locking element which is selectively movable between closing member locking and unlocking positions, an electric activator operable to move the locking element to the unlocking position, and an emergency manually-operable unlocking device operable to move the locking element to the unlocking position independently of the electric actuator, said emergency unlocking device including a first pulling element operably connected to the locking element, wherein the electric actuator is operably connected to the locking element by a second pulling element, wherein the first pulling element is coupled to the second pulling element at a position between the actuator and the locking, and wherein the second pulling element is a cable control.

13. A lock assembly according to claim 12, wherein the first pulling element is a cable control.

14. A lock assembly according to claim 12, wherein the first pulling element is coupled by means of one connecting end by way of the connection device with the second pulling element and, by means of a second actuating end, is guided out of a vehicle body space covered by the vehicle body part to the exterior side of the vehicle.

15. A lock assembly according to claim 13, wherein the first and second pulling elements are connected by a cable clamp.

16. A lock assembly according to claim 13, wherein the first and second pulling elements are connected by a loop in a connecting end of the first pulling element, which loop is placed around the second pulling element.

17. A lock assembly according to claim 12, wherein the vehicle body space is a luggage compartment, and wherein the vehicle body part to be opened is a hood covering the luggage compartment.

18. A lock assembly according to claim 1, wherein the movable lock element is a rotary latch.

* * * * *